United States Patent [19]

Takahashi

[11] Patent Number: 4,655,557

[45] Date of Patent: Apr. 7, 1987

[54] OBLIQUE VIEWING OPTICAL SYSTEM FOR ENDOSCOPES

[75] Inventor: Susumu Takahashi, Hachiouji, Japan

[73] Assignee: Olympus Optical Co., Ltd., Tokyo, Japan

[21] Appl. No.: 686,924

[22] Filed: Dec. 27, 1984

[30] Foreign Application Priority Data

Dec. 28, 1983 [JP] Japan .................. 58-245549

[51] Int. Cl.[4] .............. G02B 23/02; G02B 23/26; G02B 17/00
[52] U.S. Cl. .................. 350/445; 350/96.26; 350/447
[58] Field of Search ............ 350/96.26, 445, 447

[56] References Cited

U.S. PATENT DOCUMENTS

| 4,138,192 | 2/1979 | Yamasita ............ 350/447 X |
| 4,515,444 | 5/1985 | Prescott et al. .......... 350/413 |

FOREIGN PATENT DOCUMENTS

| 2430148 | 1/1975 | Fed. Rep. of Germany ... 350/96.26 |
| 2546211 | 4/1976 | Fed. Rep. of Germany ... 350/96.26 |
| 1425097 | 12/1965 | France ............ 350/96.26 |
| 58-56848 | 12/1983 | Japan . |
| 332876 | 11/1958 | Switzerland ........ 350/445 |

*Primary Examiner*—John K. Corbin
*Assistant Examiner*—Scott J. Sugarman
*Attorney, Agent, or Firm*—Cushman, Darby & Cushman

[57] ABSTRACT

An oblique viewing optical system for endoscopes wherein, in order to make it easy to work and assemble the component parts and to reduce the light amount loss, a visual field direction changing prism is formed of a first prism and second prism, the first prism is so arranged that its entrance surface intersects at right angles with the visual field direction, the second prism is so arranged that the first reflecting surface is parallel with the axis of the endoscope and the second reflecting surface cemented to the first prism through a cementing agent intersects at an acute angle with the above mentioned axis and the angle made by the above mention first reflecting surface and visual field direction, the refractive index of the cementing agent and the refractive index of the first and second prisms are made to meet a predetermined condition.

3 Claims, 3 Drawing Figures

OBLIQUE VIEWING OPTICAL SYSTEM FOR ENDOSCOPES

BACKGROUND OF THE INVENTION (a) Field of the Invention

This invention relates to an oblique viewing optical system for endoscopes and more particularly for endoscopes for inspecting infants.

(b) Description of the Prior Art

A conventional oblique viewing optical system of this kind is disclosed, for example, in Japanese Patent Publication No. Sho 58-56848. As shown in FIG. 1, this is formed of an objective 1, a relay lens 2 connected to the objective 1, a field lens 3 and an eyepiece 4, the objective 1 is formed of a front lens group $L_1$ comprising in combination an oblique plano-concave lens 5, a visual field direction changing prism consisting of a first prism 6 and second prism 7 and a plano-convex lens 8, and a rear lens group $L_2$ comprising a bi-convex lens 9 and plano-concave lens 10 cemented to each other so that a light incident obliquely to the axial direction of the endoscope will once pass through the boundary of the first prism 6 and second prism 7, then will be reflected in turn by the first reflecting surface (bottom surface) and second reflecting surface (boundary surface with the first prism 6) of the second prism 7 and will be directed to the direction coinciding with the axial direction. However in the case of this oblique viewing optical system, there has been a problem that, as the first reflecting surface of the second prism 7 is at a considerably large angle with the axial direction of the endoscope, the contour of the second prism 7 will be so small that it will be very difficult to work the second prism 7 and to assemble the objective 1 in view of the fact that the diameter of an ordinary endoscope for inspecting infants is only about 1 mm. There has been also a problem that the length of the second prism 7 is so small that the deviation in the visual field direction by the position deviation will be likely to become large. Further, there has been a problem that, as the width of the rear end surface of the second prism 7 can not help becoming small, in the case of an optical system of a wide (bright) light bundle, the light bundle will be cut and the light amount loss will be large. Also, in the case of this oblique optical system, an air layer 11 is provided on the boundary between the first prism 6 and second prism 7 so that the light may be transmitted and reflected on this boundary by utilizing the refractive index difference between the air layer 11 and the prisms 6 and 7. However, there has been a problem that it is so difficult to provide the air layer 11 in the front lens group $L_1$ of the extremely small objective 1 as described above that, as a result, it will be more difficult to assemble the objective 1.

SUMMARY OF THE INVENTION

In view of the above mentioned problems, a primary object of the present invention is to provide an oblique viewing optical system for endoscopes wherein it is made easy to work a visual field converting prism and to assemble an objective, the deviation in the visual field direction by the position deviation of the assembled optical parts is made small and, even in an optical system of a wide light bundle, the light amount loss will be small.

According to the present invention, this object is attained where the entrance surface of the first prism of the visual field direction changing prism is made to be at right angles with the visual field direction, the first reflecting surface of the second prism is made parallel with the axial direction of the endoscope, the boundary surface between the first prism and second prism is made to be at an acute angle with the axial direciton of the endoscope and is made the second reflecting surface of the second prism and the first and second prisms are cemented to each other with a cementing agent on the boundary surface so as to satisfy the below mentioned condition $$\left| \cos\left(\frac{\alpha}{2}\right) \right| > \frac{n_C}{n_G} > \left| \cos\left(\frac{3}{2}\alpha\right) \right|$$

where the symbol $\alpha$ represents a visual field direction angle (an angle made by the first reflecting surface and the visual field direction), $n_C$ represents a refractive index of the cementing agent and $n_G$ represents a refractive index of both prisms. Thereby, the second prism will become large in the length and contour and, even in an optical system of a wide light bundle, the light bundle will not be cut.

According to a preferred formation of the present invention, the side surface to be the first reflecting surface of the second prism is coated with an aluminum film.

This and other objects of the present invention will become more apparent during the course of the following detailed description and appended claims.

DESCRIPTION OF THE PREFERRED EMBODIMENT

Figure 2:
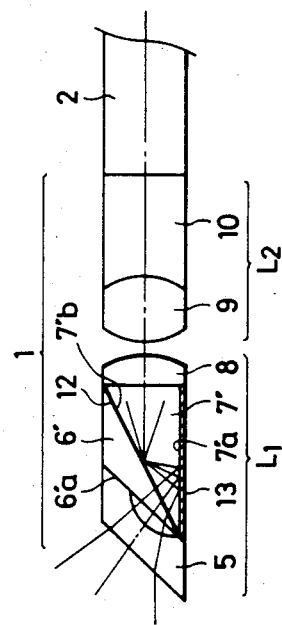
FIG. 2 is a view showing an objective of an embodiment of the oblique viewing optical system according to the present invention.

The present invention shall be explained in detail in the following on the basis of the embodiment shown in FIG. 2 by attaching the same reference numerals respectively to the same members as in the above mentioned conventional example. The reference numeral $6'$ denotes a first prism with the entrance surface $6'a$ at right angles with the visual field direction, $7'$ denotes a second prism with the first reflecting surface $7'a$ parallel with the axial direction of the endoscope, the boundary surface between the first prism $6'$ and second prism $7'$ is made to be at an acute angle with the axial direction and the boundary surface is made the second reflecting surface $7'b$ of the second prism and is cemented with a cementing agent 12. A visual field direction changing prism is formed of these components by satisfying the later mentioned conditions. By the way, the reference numeral 13 denotes an aluminum film coating the side surface to be the first reflecting surface $7'a$ of the second prism $7'$.

Figure 1:
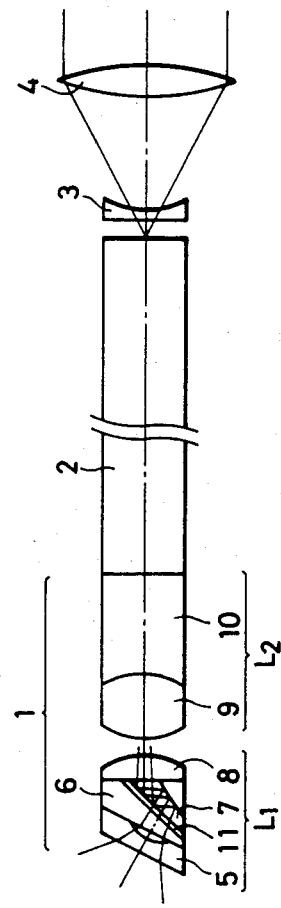
FIG. 1 is a view showing a conventional oblique viewing optical system for endoscopes.
Figure 3:
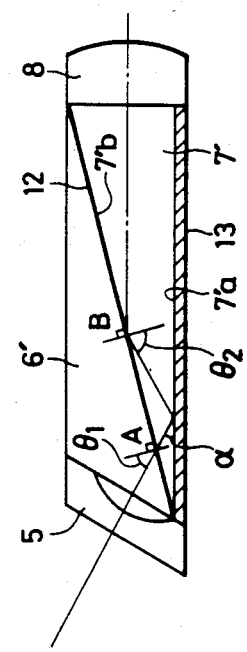
FIG. 3 is a magnified view of an essential part of the above mentioned embodiment.

In FIG. 3 which is a magnified view of an essential part of the above mentioned embodiment if the visual field direction angle is represented by $\alpha$, the refractive index of the cementing agent 12 is represented by $n_C$, the refractive index of both prisms $6'$ and $7'$ is represented by $n_G$, the entrance angle to the boundary surface is represented by $\theta_1$ and the entrance angle to the second reflecting surface is represented by $\nu_2$, it will be necessary that first of all, the entering light will be reflected by the first reflecting surface $7'a$, then will be reflected by the second reflecting surface $7'b$ and will proceed in the axial direction of the endoscope, therefore $$\theta_1 = \left(90° - \frac{3}{2}\alpha\right), \theta_2 = \left(90° - \frac{\alpha}{2}\right). \tag{1}$$

Also, it will be necessary that the light will be transmitted through the point A and therefore $$|\theta_1| < \theta_C \text{ (Critical angle)} = \sin^{-1}\left(\frac{n_C}{n_G}\right). \tag{2}$$

Also, it will be necessary that it will be totally reflected at the point B and therefore $$|\theta_2| > \theta_C \text{ (Critical angle)} = \sin^{-1}\left(\frac{n_C}{n_G}\right). \tag{3}$$

Therefore, from the formulae (2) and (3), $$|\sin\theta_2| > \frac{n_C}{n_G} > |\sin\theta_1|. \tag{4}$$

and, by adding the condition of the formula (1) to this, $$\left|\cos\frac{\alpha}{2}\right| > \frac{n_C}{n_G} > \left|\cos\frac{3}{2}\alpha\right|. \tag{5}$$

Concretely, in case the visual direction angle is $\alpha = 30°$, it will be necessary to satisfy the condition of $0.9659\ldots > n_C/n_G > 0.7071\ldots$
Here, if the refractive index of the cementing agent 12 is $n_C = 1.56$, the condition of the refractive index of the prisms 6' and 7' will be
$2.206\ldots > n_G > 1.615\ldots$
Also, if the visual field direction angle is $\alpha = 45°$ and the refractive index of the cementing agent 12 is $n_C = 1.56$, the condition of the refractive index of the prisms 6' and 7' will be
$4.07\ldots > n_G > 1.688\ldots$
As the oblique viewing optical system according to the present invention is formed as described above and the first reflecting surface $7'a$ of the second prism $7'$ is made parallel with the axial direction of the endoscope, the contour of the second prism $7'$ will become large and, as a result, it will become easy to work the second prism $7'$ and to assemble the objective 1 and therefore the deviation in the visual field direction by a backlash will be reduced. Also, as the width of the rear end surface of the second prism $7'$ is large, even in an optical system of a wide light bundle, the light bundle will not be cut and the light amount loss will be small. As the cementing agent 12 is used on the boundary between the first prism 6' and second prism 7', it will be all the more easy to assemble the extremely small objective 1.

As described above, the oblique viewing optical system for endoscopes according to the present invention has such practically important advantages that it is easy to work the visual field direction changing prism and to assemble the objective, the deviation in the visual field direction by a backlash is small and, even in an optical system of a wide light bundle, the light amount loss will be small.

What is claimed is:

1. An oblique viewing optical system for endoscopes comprising a first prism, and a second prism having a first reflecting surface and second reflecting surface to form a visual field direction changing prism, said first prism being so arranged that its entrance surface intersects at right angles with the visual field direction, said second prism being so arranged that the first reflecting surface is parallel with the axis of the endoscope and the second reflecting surface cemented to said first prism through a cementing agent intersects at an acute angle with said axis, and satisfying the below mentioned condition:

$$\left|\cos\left(\frac{\alpha}{2}\right)\right| > \frac{n_C}{n_G} > \left|\cos\left(\frac{3}{2}\alpha\right)\right|$$

where the symbol $\alpha$ represents an angle made by the first reflecting surface of the second prism and the visual field direction, $n_C$ represents a refractive index of the cementing agent and $n_G$ represents a refractive index of the first and second prisms.

2. An oblique viewing optical system according to claim 1 wherein the side surface to be the first reflecting surface of said second prism is coated with an aluminum film.

3. An oblique viewing optical system according to claim 1 further comprising an oblique plano-concave lens placed on the entrance surface of said first prism, a first plano-convex lens placed on the exit surface of said second prism, a second bi-convex lens arranged in the rear of said first plano-convex lens and a plano-concave lens cemented to said second bi-convex lens.

* * * * *